(12) United States Patent
Brodbeck et al.

(10) Patent No.: US 7,841,263 B1
(45) Date of Patent: Nov. 30, 2010

(54) APPARATUS FOR CUTTING TUBES

(75) Inventors: Adolf Brodbeck, Metzingen (DE);
Siegfried Maier, Metzingen (DE)

(73) Assignee: Adolf Brodbeck Maschinenbau GmbH & Co. KG, Metzingen (DE)

( * ) Notice: Subject to any disclaimer, the term of this patent is extended or adjusted under 35 U.S.C. 154(b) by 0 days.

(21) Appl. No.: 09/551,252

(22) Filed: Apr. 18, 2000

(30) Foreign Application Priority Data

Jul. 27, 1999 (DE) .............................. 299 12 657 U

(51) Int. Cl.
*B23B 5/14* (2006.01)
*B26D 3/143* (2006.01)
*B26D 3/16* (2006.01)

(52) U.S. Cl. ..................... 82/83; 82/46; 82/92; 82/101; 82/54; 493/471; 493/472

(58) Field of Classification Search ................. 493/342, 493/366, 367, 472, 471; 82/46–48, 70, 83, 82/85–87, 89, 90, 92, 93, 100–102; 83/54
See application file for complete search history.

(56) References Cited

U.S. PATENT DOCUMENTS

| 2,321,323 | A | * | 6/1943 | Sappenfield | .................... 82/86 |
| 3,383,965 | A | * | 5/1968 | Snyderman | ................... 82/101 |
| 3,481,234 | A | * | 12/1969 | Luce, Sr. | ..................... 82/47 X |
| 4,713,992 | A | * | 12/1987 | Languillat | .................. 82/101 X |
| 5,019,028 | A | * | 5/1991 | Engel et al. | ................. 493/290 |
| 5,271,137 | A | * | 12/1993 | Schutz | ....................... 493/288 |
| 5,383,380 | A | * | 1/1995 | Sartori | ........................ 82/70.1 |

\* cited by examiner

*Primary Examiner*—Clark F. Dexter

(57) ABSTRACT

An apparatus for cutting tubes includes a counter holder arranged to receive a tube, having at least one cutting tool that is movable to a cutting position on the counter holder during a cutting process, having an ejector that ejects cut-off portions of the tube, wherein the ejector is movable relative to the counter-holder, having a slide that is movable along the counter-holder on which the at least one cutting tool and the ejector are provided, and having a programmable control for freely setting cut-off lengths of tubular sleeves by moving the cutting tool on the slide.

8 Claims, 4 Drawing Sheets

APPARATUS FOR CUTTING TUBES

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to an apparatus for cutting tubes, particularly cardboard tubes.

TECHNICAL FIELD

Cardboard tube cutting machines are already known in which a cutting tool is provided which is stationary relative to the counter-holder. The cardboard tube, which is mounted on a counter-holder, is moved relative to the cutting tool by means of an ejector, the advance path relative to the cutting tool determining the tube length of a cut-off sleeve. These machines require a considerable constructional space, since their length requires at least twice the tube length of the cardboard tube to be processed.

Furthermore, an apparatus is known which has a counter-holder to receive a tube, the tube being supported freely on the counter-holder. The tube is held during a cutting process, rotating in a defined position, by means of two manually adjustable guide rollers. A horizontal holding arrangement, on which one or more cutting tools are provided, is provided above the counter-holder. These cutting tools can be actuated individually or simultaneously, so that several sleeves of the same length can be cut at fixed and uniform spacings. A separately driven stripper runs along the counter-holder to eject the sleeves. This apparatus makes it possible for several sleeves to be cut simultaneously in one cutting process, because of the multiplicity of the arranged cutting tools. However, this machine requires a time-consuming setting of the cutting tools and increased change-around times if a cut-off length of sleeves is to be produced, different from that which is set. Moreover, the minimum cut-off length is restricted by the width of the individual cutting tools. In addition, the cut-off length cannot be changed for individual sleeves during the process of cutting one cardboard tube.

SUMMARY OF THE INVENTION

The invention therefore has as its object to provide an apparatus which is of simple design, which can be selectively set to different cut-off lengths, and which makes possible a quick ejection of the cut tube sleeves after the cutting of the sleeves.

This object is attained according to the invention having a counter holder arranged to receive a tube, at least one cutting tool that is movable to a cutting position on the counter holder during a cutting process, an ejector that ejects cut-off portions of the tube, the ejector being movable relative to the counter-holder, a slide that is movable along the counter-holder, on which the at least one cutting tool and the ejector are provided, and a programmable control for freely setting cut-off lengths of tubular sleeves by moving the cutting tool on the slide.

A rational processing of a tube for the production of sleeves of different lengths is made possible by the arrangement and constitution, according to the invention, of a slide which is movable relative to the counter-holder and on which both a cutting tool and an ejector are provided. After the same or different cut-off lengths of the sleeves have been cut by means of the cutting tool, the slide is located at an end position of the tube. The ejector can now be simultaneously actuated, so that a simultaneous ejection of the sleeves from the counter-holder takes place during a return travel of the slide into its initial position for a subsequent work cycle. A displaceable element engaged by the ejector when the sleeve or sleeves is/are stripped off can be automatically guided over into an initial position of the ejector by the following introduction or pushing-on of the tube onto the counter-holder. The movement of the slide between the individual cutting processes, and also the resetting into the initial position, can be controlled by the integrated data processing equipment and controller, so that both equal and also different cut-off lengths can be programmed.

Furthermore the integration of such a programmable control has the advantage that the individual cut lengths can be optimized for a given tube length and with respect to the individual cut-off lengths, so that substantially the complete length of the tube can be utilized. Thus, for example, one or more sleeves of equal length, and toward the end of the tube one or more sleeves with a cut-off length deviating from the first cut-off length, can be cut during one working process, so that up to a respective cut portion at the end of the tube, no, or nearly no, waste can arise.

According to an advantageous embodiment of the invention, it is provided that the cutting knife and the ejector are arranged on a flange which is removably arranged on a slide. A rapid and simple change of the cutting knife can then take place by means of a further unit. Alternatively, it can also be provided that only a rapid change unit of the cutting knife is provided on a holder which in its turn is arranged on the flange. By means of this removable flange, which is preferably arranged by means of quick-acting clamping means, the apparatus can be quickly changed over to cutting tools with and without drive.

According to a further advantageous embodiment of the invention, it is provided that the ejector has a driving element which can travel in the direction toward the counter-holder and which engages with an element on the counter-holder. It can thereby be made possible that, for example when the slide is repositioned from a last cutting position into a starting or null position at the beginning of the tube, an ejection of the cut-off sleeves into a travel path can simultaneously take place. An expensive mechanism which occupies a considerable constructional space is thereby not required in order to strip the cut-off sleeves from the counter-holder. At least two functions, in particular stripping of the sleeves and resetting of the slide into an initial position, can be simultaneously implemented in one movement process.

According to a further advantageous development of the invention, it is provided that a recognition means, preferably a proximity switch, is provided on the flange and is arranged at an acute angle to an end of the tube which abuts a counter-holder. The beginning of the tube can thus be recognized with great accuracy, since in contrast to the otherwise usual arrangements, a reflection of the waves or beams by the counter-holder, falsifying the recognition, can be excluded. It is advantageously provided that the first cut or initial cut after the beginning of the tube has a given distance which can be determined by the data processing equipment. Thus a clean first cut shortly after the beginning of the tube can take place, so that the waste is again small and a high utilization of material can be attained.

According to the invention, further advantageous developments are set forth herein.

BRIEF DESCRIPTION OF THE DRAWINGS

A preferred embodiment example of the invention is explained in the following examples.

DETAILED DESCRIPTION OF THE INVENTION

Figure 1:
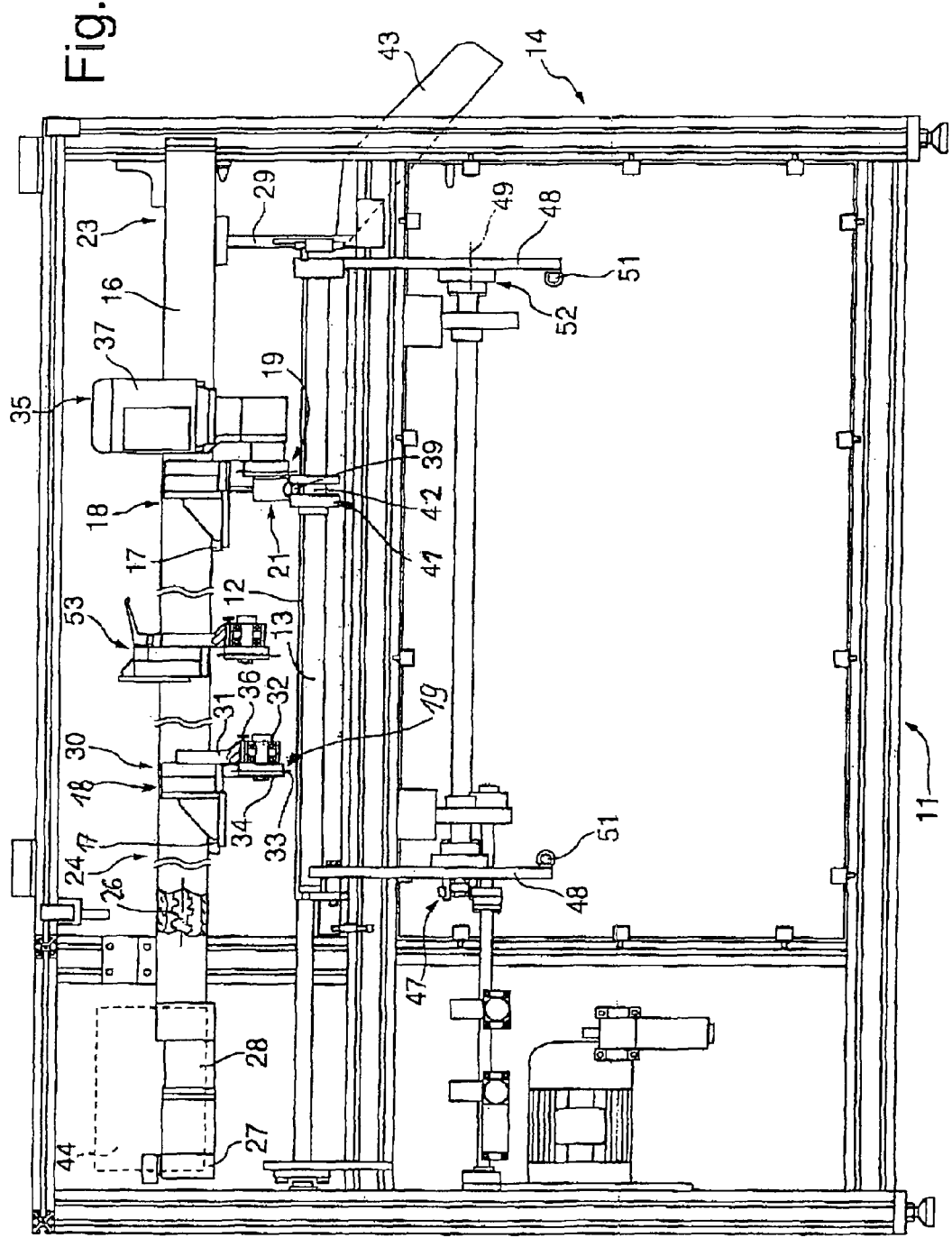
FIG. 1 shows a side view of the apparatus according to the invention.

FIG. 1 shows a schematic representation of an apparatus 11 for the cutting of tubes 12, in particular paper or cardboard tubes. Plastic tubes or tubes of further materials can likewise also be cut. The tubes 12 can have different internal diameters. For example, a tube diameter of 20-750 mm can be processed. The wall thickness of the tube 12 can be up to 40 mm, for example.

Figure 3:
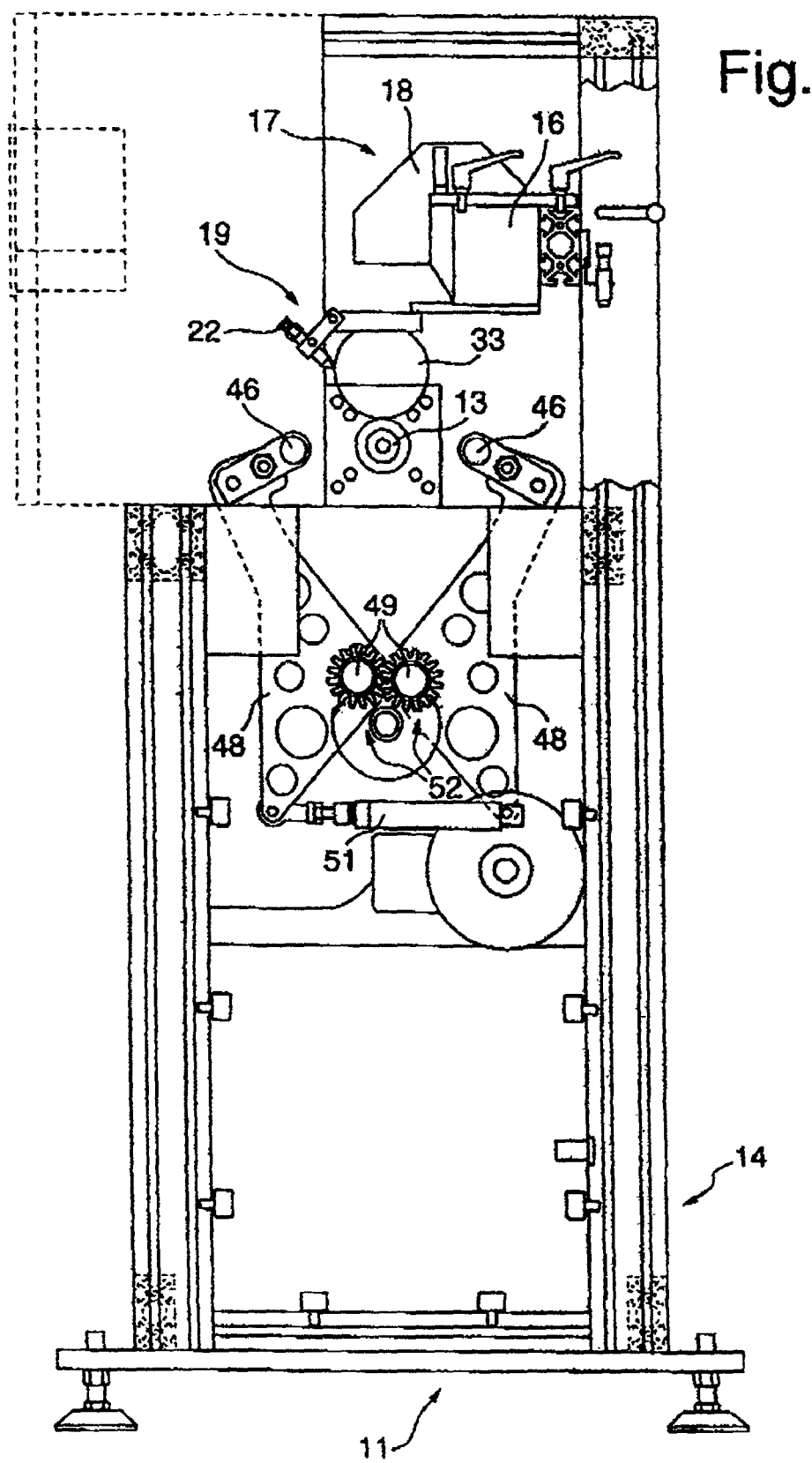
FIG. 3 shows an end view of the apparatus, from the left according to FIG. 1.

The tube 12 is received by a counter-holder 13 which is mounted on a base frame 14 of the apparatus 11. The base frame 14 furthermore receives in the upper section a guide rail 16, on which a slide 17 is arranged to be displaceable along the counter-holder 13. A flange 18 can be fastened to the slide 17 and receives a cutting tool 19, an ejector 21, and a proximity switch 22 (FIG. 3). The range of movement of the slide 17 includes on the one hand an initial position 23 at the right-hand end of the guide rail 16 and an ejector position 24 at the left-hand end of the guide rail 16. The distance from the initial position 23 to the ejector position 24 corresponds at least to the length of the counter-holder 13 which is available for the support of a tube 12.

The guide rail 16 includes a housing in which a threaded spindle 26 is rotatably mounted. The slide 17 has a corresponding guide element (not shown) which engages the threaded spindle 26. A servomotor or stepping motor 27 is provided at a drive-side end of the threaded spindle 26, and engages the threaded spindle 26 via a coupling 28.

The stepping motor 27 is selected such that, for example, a 1:1 transmission can take place from the drive shaft (not shown) of the motor 27 to the threaded spindle 26, so that precise driving of the slide 17 and thus an exact travel path with respect to the cutting tool 19 can be attained.

It can alternatively be provided that a gear is arranged between the threaded spindle and the motor 27. It can furthermore be alternatively provided that the slide 17 is driven to travel along the guide rail 16 by means of a toothed belt, a chain, or the like, e.g., the threaded spindle 26 shown in FIG. 1.

The counter-holder 13 is fixedly or rotatably mounted to a left side of the base frame 14. At its right-hand free end, an abutment 29 is provided which is pivotably arranged on the guide rail 16 and which receives the free end of the counter-holder 13 during the cutting process. The abutment 29 is pivoted out of its holding position for the loading and unloading of the tube 12.

In FIG. 1, a unit 30 is provided on slide 17, and has a non-rotatingly driven cutting tool 19. A unit 35 is furthermore shown which has the cutting tool 19, which is driven by the motor 37. The ejector 21 is arranged to the left of the cutting tool 19 of the unit 35. This ejector 21 has a movable bolt 39. The movable bolt 39 is movable in the direction toward the counter-holder 13. The ejector 21 is spaced apart from the counter-holder 13.

A mounting 31 is provided on the flange 18 of the unit 30, and receives via roller bearings 32 a cutting knife 33 which is freely rotatable. The cutting knife 33 is clamped between two seatings 34 and arranged interchangeably with respect to the mounting 31. This can be made possible in that one of the seatings 34 is released, or in that the mounting 31 is released, or in that the whole unit 30, and thus the flange 18, is removed from the slide 17.

Alternatively to the freely rotatable arrangement according to the unit 30, a stationary cutting knife can also be provided. For this, a bolt 36 can be inserted in a bore of the seating 34, so that the freely rotatable arrangement of the cutting knife 33 is locked.

Furthermore, the unit 35 can alternatively be provided, the cutting tool 33, in the form of a cutting knife being driven by a motor 37. One or more units 30 or 35, which can also be provided in combination, can be selected according to the respective application. The ejector 21 is spaced apart from the units 30 or 53, as shown in FIG. 1. The cutting units 30, 53 and 35 and the ejector 21 are each connected to the threaded spindle 26 by the slide 17 for movement along the guide rail 16, as shown in the upper portion of FIG. 1.

The cutting tool 19 can be arranged to be resiliently compliant. During the cutting process, the cutting tool 19 is moved toward the counter-holder 13, for example, by means of a mechanism, compressed air, pneumatic system, or electric motor, or the like. During the movement, the tube 12 rotating on the counter-holder 13 is cut. After the cutting tool 19 nearly abuts the counter-holder 13 or contacts this, a possible further feed can be compensated by the resiliently compliant arrangement. The life of the cutting tool 19 can thereby be increased. The cutting quality can be thereby increased at the same time, due to the smaller damage to the cutting tool 19. It can be advantageously provided that the counter-holder 13 is arranged to be insulated with respect to the base frame 14, so that the cutting tool 19 comes into electrical contact when it strikes, or rests on, the counter-holder 13, upon which the feed movement or the cutting movement of the cutting tool 19 is immediately stopped. This or a similar kind of electrical monitoring likewise increases the life of the cutting tool 19.

The proximity switch 22 is arranged on the flange 18, to the right of the cutting tool 19 in the embodiment example. This is arranged on the flange 18 at an acute angle to an end surface of the tube 12, so that a scan does not take place perpendicularly from above, and thus parallel to the end surface of the tube 12, but that the end surface of the tube 12 is used as the reference surface. The beginning of the tube 12 can thereby be determined exactly. The proximity switch 22 can for example be provided as an infrared sensor or the like. Further optoelectronic switches can likewise be used.

The ejector 21 is arranged to the left of the cutting tool 19 of the unit 35. This ejector 21 is connected to the guide rail 16 through the ejector sleeve 41 and has a movable bolt 39 which is movable in the direction toward the counter-holder 13 or an ejector sleeve 41. As soon as, for example, the flange 18 has come into an ejector position 24, the ejector 21 can be driven by means of a relay or by means of a control, as is known in the art, so that the bolt 39 engages in a groove 42 or in a correspondingly formed recess on the bolt 39. After this is positively arranged in the groove 42, the slide 17 can be guided over into the initial position 23, upon which the cut-off sleeve is ejected and is simultaneously guided away via a chute 43. Immediately before the end of the counter-holder 13, the bolt 39 is brought back into its initial position, so that the ejector sleeve 41 remains near the free end of the counter-holder 13, which is brought back into its initial position by loading a new tube 12 onto the counter-holder 13.

The apparatus 11 furthermore has a programmable data processing equipment and control 44. The cut-off length of the respective sleeves can be freely programmable by this. Thus, for example, several sleeves of equal or different lengths can be cut from a tube 12. It can also be provided, according to a program, that an optimizing of cutting is programmable in dependence on the total length of the tube 12, according to which a number of sleeves with a first cut length, a further number of sleeves with a second cut length, and possibly a further number of sleeves with one or more further cut lengths are cut, in order to make the cutting waste as small as possible. During the stripping phase of the sleeves, a positioning of different goods baskets under the chute 43 can take place, corresponding to the movement of the slide 17 from the ejector position 24 into the initial position 23, so that a sorting of the different cut lengths can take place simultaneously with the stripping.

Furthermore, the distance of the first cut from the beginning of the tube 12 can be set by this data processing equipment. This cut can be situated immediately after the beginning of the tube 12, or for example one or two centimeters behind it.

Alternatively, two or more slides 17 can be provided on the guide rail 16, arranged at a given distance from each other, whereby a cut optimization can take place by means of the program control to the effect that, for example with three slides with cutting tools 19 arranged on them, the cutting time of the whole tube can be reduced to a third. Furthermore, it can be alternatively provided that two or more guide rails are provided to a counter-holder, so that on each guide rail respectively one or more cutting tools 19 can follow, independently of the cutting tool or tools 19, on the further guide rail or rails. In particular, with very long tubes, such an arrangement can lead to a reduction of cycle times. The individual cutting processes can be coordinated by a common control, so that a frictionless cutting of the sleeves into the respectively required lengths can take place.

Figure 2:
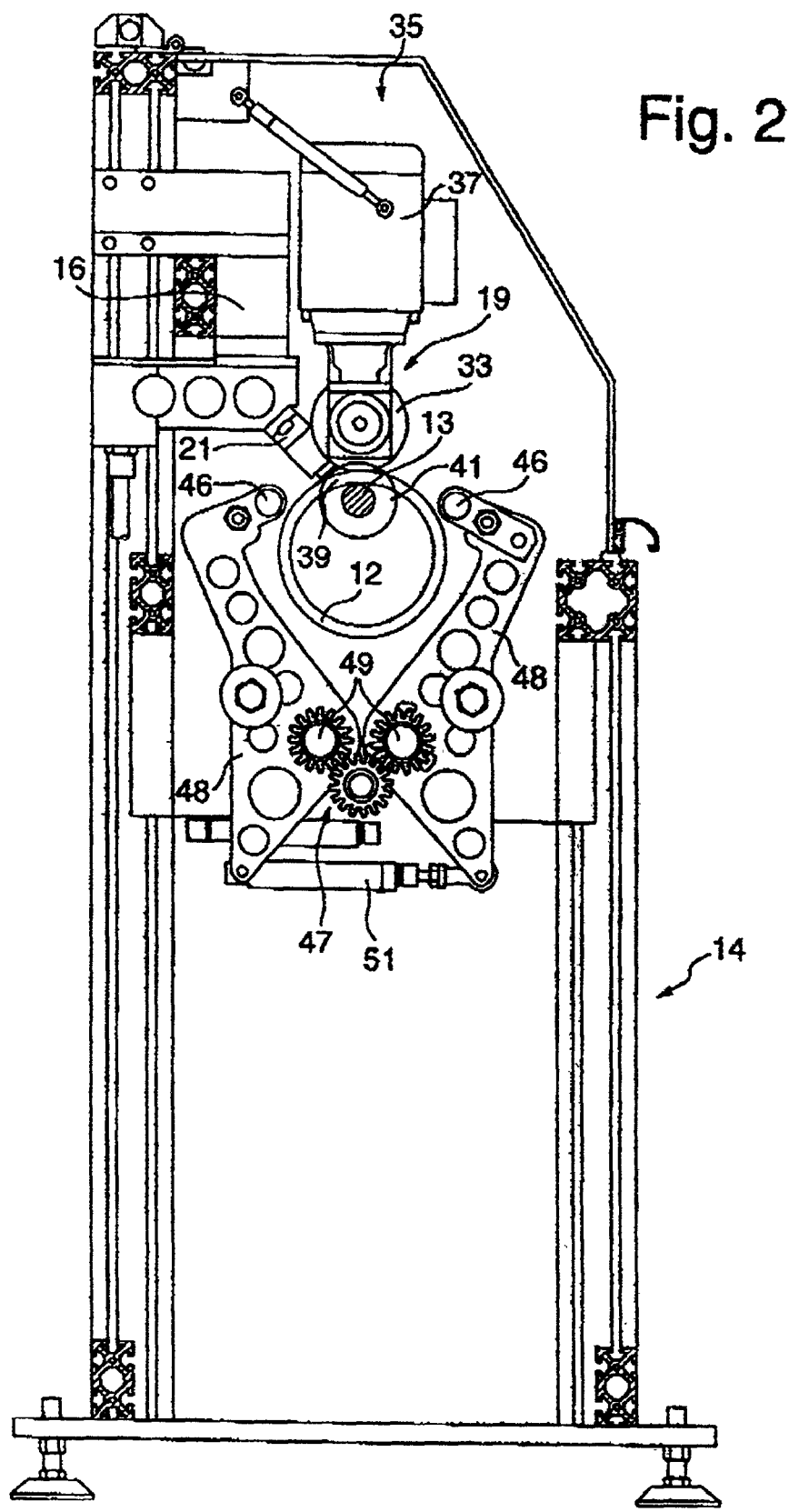
FIG. 2 shows an end view of the apparatus, from the left according to FIG. 1.

The tube 12 is held in a defined position during a cutting process by guide rollers 46 arranged to left and right of the counter-holder 13, as is shown, for example, in FIG. 2. The guide rollers 46 engage such that they hold the tube 12 down on the counter-holder 13. The counter-holder 13 is advantageously made small in comparison with the tube diameter of the tube 12, so that the latter is freely supported on the counter-holder 13. It can likewise be provided, for example with a small diameter of the tube 12, that the counter-holder corresponds approximately to the internal diameter of the tube 12. In this case of application, the guide rollers 46 have a supporting action, in particularly so that the counter-holder is supported when it receives the cutting force. The guide rollers 46 can, for example, be arranged in a ten o'clock or two o'clock position. The guide rollers 46 advantageously extend almost over the whole length of the counter-holder 13. At least one of the two guide rollers 46, or advantageously both guide rollers, are driven, in order to set the tube 12 in rotation. In FIG. 2, the drive for the guide rollers 46 by belts or chains or the like is represented, a gearwheel drive 47 being illustrated which makes it possible for both the left and the right guide rollers 46 to have the same drive speed. The guide rollers 46 are received on supporting arms 48, which are respectively mounted for pivoting around a shaft 49 by means of a power element 51 which is preferably driven by compressed air. The synchronous movement of the supporting arms 48 during the advance movement is made possible by the gearwheel pair 52 according to FIG. 3. The power element 51 can be driven either electrically or pneumatically. The use of compressed air has the advantage that on exceeding a given operating pressure a further feed movement of deflection of the supporting arms 48 is prevented, so that it can be ensured that the guide rollers 46 rest on the tube 12 with a minimum pressure and also drive it in rotation. The guide rollers 46 are advantageously hinged on the supporting arms 48 so that a fine adjustment to different diameters of the tube 12 can take place; it is advantageously provided that the drive of the guide rollers 46 can remain the same, independently of the fine adjustment. The compressed air supply and also the drive of the supporting arms 48 is shown schematically in FIG. 1 in the left-hand portion of the base frame 14.

In FIG. 1 it is furthermore shown as an alternative that the apparatus 11 can also be provided with cutting tools 19 fixed to the guide rail 16 for specific applications, as is shown, for example, by the unit 53. Such a unit 53 can be additionally provided, for example between two movable slides 17, or instead of displaceable slide 17.

It can furthermore be alternatively provided that the ejector 21 engages with a movable bolt or the like directly at the end of a tube 12 in order to strip the cut sleeves from the counter-holder 13 without an ejector portion 41 being provided. Likewise, instead of the ejector 21, the cutting knife could take over the stripping function.

A feed movement of the cutting tool 19 can likewise be driven by the programmable data processing equipment and control during the cutting process in dependence on the raw material and also on the wall thickness of the tube. The feed speed can likewise be adjusted in dependence on a driven cutting tool 19.

A complete set of claims currently in this application, with status indicators, is attached hereto.

Figure 4:
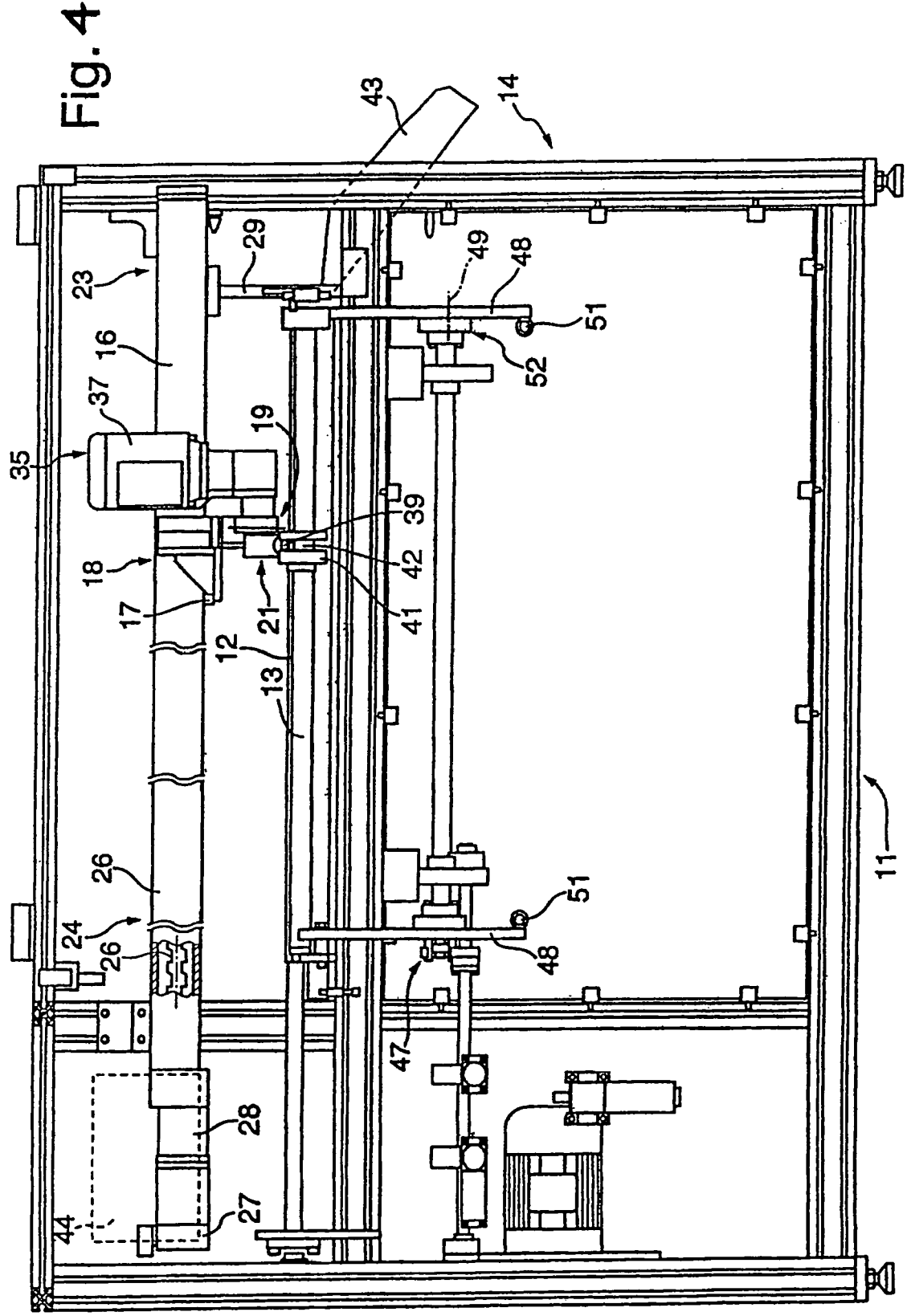
FIG. 4 shows a side view of an another embodiment of the invention without the alternative structure.

In FIG. 4, the apparatus is shown without the alternative structure.

The invention claimed is:

1. Apparatus for cutting tubes comprising:
a counter-holder arranged to receive a tube,
said counter-holder having an ejector sleeve mounted thereon, wherein said ejector sleeve is movable along the counter-holder,
a cutting tool that is movable to a cutting position during a cutting process,
a slide carrying the cutting tool and carrying an ejector, said ejector having a coupling element that can travel in a direction toward the counter-holder and engage a seating of said ejector sleeve, and
a programmable control to control the movement of said slide, said cutting tool and said ejector sleeve,
wherein the movement of said slide is controlled between an initial position and an ejector position, such that
for cutting the tube, the cut-off lengths of tubular sleeves are freely settable by moving said slide to position said cutting tool, and
for ejecting the cut-off lengths of tubular sleeves, the slide is positioned in the ejector position and said coupling element is actuated to engage said seating of said ejector sleeve to couple said ejector sleeve to said slide to strip off the tubular sleeves from the counter-holder when moving the slide from the ejector position to the initial position.

2. The apparatus according to claim 1, further comprising a flange that is removably fastened to said slide.

3. The apparatus according to claim 1, wherein a cutting knife of the cutting tool is fixedly or rotatably arranged on a mounting of said slide.

4. The apparatus according to claim 3, wherein the rotatably arranged cutting knife is arranged free wheeling.

5. The apparatus according to claim 3, wherein the rotatably arranged cutting knife is driven by a motor with a preselectable rotation speed.

6. The apparatus according to claim 1, further comprising a flange mounted to said slide, wherein said cutting tool is resiliently, compliantly mounted to said flange against a feed movement of said cutting tool.

7. The apparatus according to claim 1, wherein said tube is mounted free wheeling on said counter-holder and is rotated by power-operation by a left and a right guide roller.

8. The apparatus according to claim 1, wherein said slide is moved on a guide parallel to said counter-holder by an actuating drive in dependence on a programmable cut length of said tube.

* * * * *